United States Patent
Ooyama et al.

(10) Patent No.: US 6,359,767 B1
(45) Date of Patent: Mar. 19, 2002

(54) APPARATUS FOR CONTROLLING MAGNETIC LEVITATION SYSTEM

(75) Inventors: Atsusi Ooyama; Shinichi Sekiguchi; Keijiro Misu, all of Kanagawa-ken (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/521,667

(22) Filed: Mar. 8, 2000

(30) Foreign Application Priority Data

Mar. 9, 1999 (JP) ............................................ 11-061804

(51) Int. Cl.[7] .............................................. H01H 47/00
(52) U.S. Cl. .................................. 361/144; 267/140.15
(58) Field of Search ................................. 361/139, 143, 361/144, 145, 146, 147, 152, 179, 187, 188; 248/550; 267/140.15

(56) References Cited

U.S. PATENT DOCUMENTS

| | | | | |
|---|---|---|---|---|
| 5,626,332 A | * | 5/1997 | Phillips et al. | 267/140.14 |
| 5,765,800 A | * | 6/1998 | Watanabe et al. | 248/550 |
| 5,876,012 A | * | 3/1999 | Haga et al. | 248/550 |
| 6,249,418 B1 | * | 6/2001 | Bergstrom | 361/139 |

FOREIGN PATENT DOCUMENTS

JP 2-206304 8/1990

* cited by examiner

*Primary Examiner*—Ronald W. Leja
(74) *Attorney, Agent, or Firm*—Armstrong, Westerman & Hattori, LLP

(57) ABSTRACT

A control apparatus in a magnetic levitation system for controlling attraction and/or repulsion forces created from a pair of electromagnets to levitate an object therebetween at a predetermined target position in a contactless manner, in response to a displacement of the object from the target position. The control apparatus includes a start/stop detector, a phase compensation circuit, an integrator, and a switching circuit. The start/stop detector detects a start and stop of a levitation control procedure and generates a control signal having a predetermined time duration when either of the start and stop of the levitation control procedure is detected. The compensation circuit provides a compensation signal to compensate AC currents flowing through the electromagnet so that the displacement of the object from the target position becomes zero. The integrator integrates the compensation signal. The switching circuit outputs the compensation signal when the control signal is not generated from the start/stop detector, and the integrated compensation signal when the control signal is generated. Therefore, the magnetic forces from the electromagnets to the object gradually varies at the beginning and ending of the procedure and hence the object is gradually levitated and seated.

2 Claims, 6 Drawing Sheets

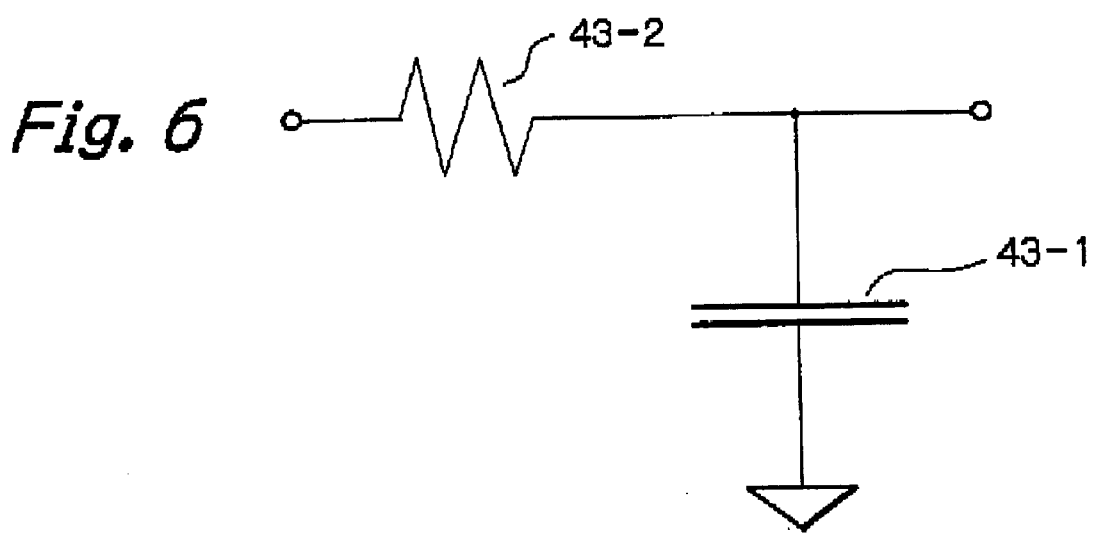
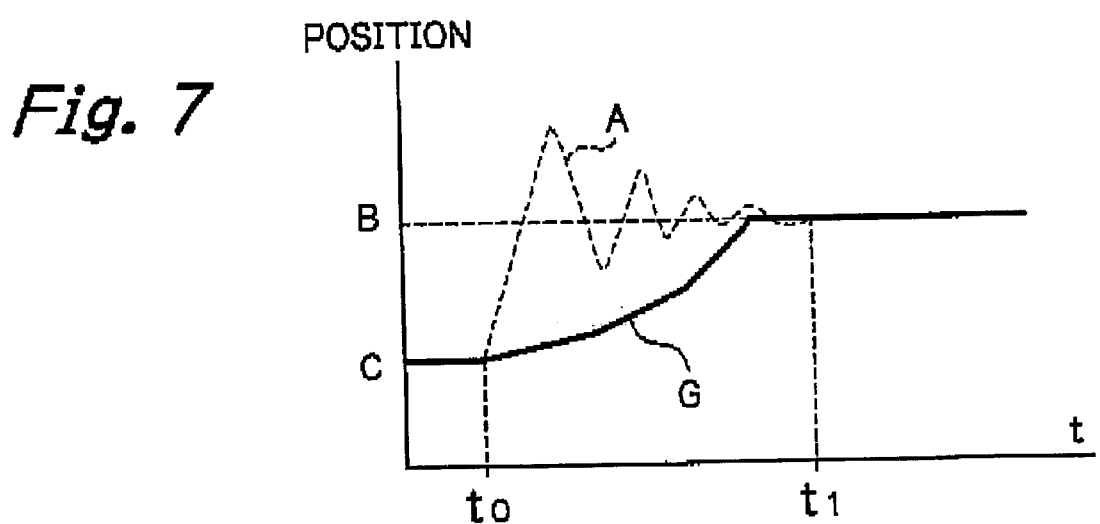
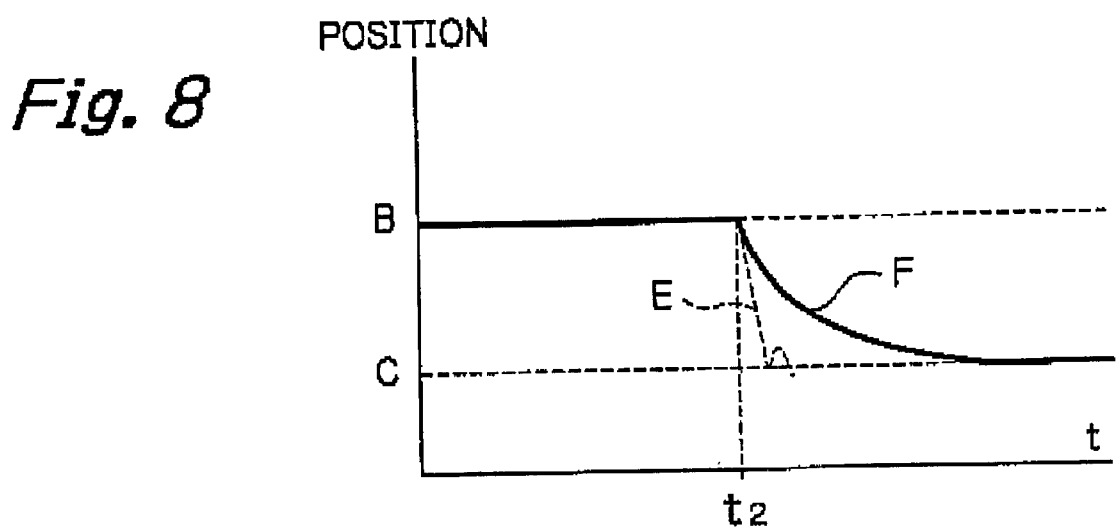

APPARATUS FOR CONTROLLING MAGNETIC LEVITATION SYSTEM

Background of the Invention

1. Field of the Invention

The present invention relates to a magnetic levitation system for levitating and supporting a magnetizable object as a target in a predetermined position in a contactless manner through magnetic attraction or repulsion forces caused by electromagnets. More particularly, the present invention pertains to a control apparatus for controlling such a magnetic levitation system as above, which is capable of depressing a transient response presented by a magnetizable object at the beginning and the ending of levitation control.

2. Description of the Related Art

FIG. 1 illustrates a schematic diagram showing an arrangement of a target or magnetizable object 15 to be levitated, electromagnets 11 and 13, and distance detection sensors 12 and 14 in a conventional magnetic levitation system. As shown in FIG. 1, the object 15 is disposed between the electromagnets 11 and 13 and also between the distance detection sensors 12 and 14.

The object 15 is levitated by magnetic attraction and/or repulsion forces generated by the electromagnets 11 and 13. The distance detection sensors 12 and 14 detect distances from the object 15 to the sensors and generate distance signals, respectively. The generated signals are then provided to a control unit (shown in FIG. 2), which controls phases and frequencies of AC currents flowing through the electromagnets 11 and 13 in response to the distance signals, so that the object 15 is levitated at a predetermined target position between the electromagnets 11 and 13.

FIG. 2 shows a block diagram of a prior art magnetic levitation system including a control unit 20 connected to the electromagnets 11 and 13 (EMs) and the distance detection sensors (DDSs) 12 and 14. The control unit 20 comprises a sensor signal processing circuit 21, a comparator 22, a phase compensation circuit 23, a variable gain amplifier 24, a main amplifier 25 and a target position (TP) signal generator 28. The distance signals detected by the sensors 12 and 14 are inputted to the sensor signal processing circuit 21, where a current levitation position of the object 15 is calculated in response to the distance signals. The obtained current position signal is compared at the comparator 22 with a target levitation position signal from the target position signal generator 28 to generate a signal representing a displacement between the current and target positions of the object 15. The phase compensation circuit 23 determines compensation currents or compensation frequencies and phases of the AC currents flowing through the electromagnets 11 and 13 so that the displacement signal from the comparator 22 becomes zero. The electromagnets 11 and 13 receive the compensated AC currents through the variable gain amplifier 24 and the main amplifier 25, and thus provide the object 15 with adequate magnetic attraction and/or repulsion forces to levitate the object 15 at the target position. Therefore, by such a feedback control as described above, the object 15 can be levitated and supported at the target position between the electromagnets 11 and 13.

According to the aforementioned prior art control manner, a target position signal is already set at the target position signal generator 28, before a levitation control procedure is carried out. Accordingly, when the levitation system initiates a levitation control procedure of an object levitation, since a displacement between a current position and a target position is relatively large, electromagnetic forces from the electromagnets 11 and 13 to the object 15 relatively large at the starting time of the procedure. Therefore, as is represented by A in FIG. 3, when the control starts at a time t0, the objects 15 rises from a seated position C to a position above the target position B and then falls to a position under the target position B, due to feedback response characteristics etc. of the magnetic levitation system. Thus, the object 15 swings around the target position B until the levitation control becomes stable condition at t1, as shown in FIG. 3.

In other words, at the moment t0 magnetic levitation of the object 15 is started, the sensor signal processing circuit 21 outputs a current position signal indicating that the object 15 is at the seated position C, and therefore, the comparator 22 outputs a differential signal indicating a difference between the target position signal from the generator 28 and the current position signal from the sensor signal processing circuit 21. As a result, an output from the comparator 22 changes stepwise at t0 as is indicated by D in FIG. 3. Therefore, an output of the phase characteristic compensation circuit 23 also varies stepwise, which causes the object 15 to suddenly levitate to the portion above the target portion B. In response thereto, the system renders the object 15 to fall down by the feedback control, by which the object 15 fall down to the position under the target position B.

The up- and-down or fluctuation of the object 15 is gradually damped and, the position of thereof is finally stabilized at the target position B at t1.

It has been confirmed by experiments, etc., that such a fluctuation or oscillation of an object at the beginning of a levitation control procedure in a magnetic levitation system appears in such cases that a stationary position or seated position C of the object 15 is not constant with respect to a target position B, and start condition of levitation of the object 15 is not constant with respect to AC currents flowing through electromagnets 11 and 13. In the worst case, the object 15 repeatedly comes into contact with the electromagnets 11 and 13 until the object 15 is levitated at the target position B in a stable manner. As a result thereof, the object 15 and/or the magnets 11 and 13 could be damaged and dust could be produced thereby. Such dust causes problems in particular when the magnetic levitation system is utilized in a semiconductor production system and so on.

Further, when levitation control procedure is stopped, the target position signal from the circuit 28 is suddenly lowered to indicate the seated position C, while the current position signal from the sensor signal processing circuit 21 is still indicate the target position B. As a result, the output from the comparator 22 and hence the output from the compensation circuit 23 change stepwise as shown by E in FIG. 4, when the control procedure is stopped at t2, the object 15 is steeply descending to the seated position C and it rebounds therefrom, resulting in damage to the object 15 and/or the magnets 11 and 13 and the production of dust.

SUMMARY OF THE INVENTION

The present invention has been accomplished in order to obviate the aforementioned problems of the prior arts. Thus, it is an object of the present invention to provide a control apparatus for controlling a magnetic levitation system, which is capable of preventing fluctuation or oscillation of a targeted object from occurring at the beginning and ending of a levitation control procedure, and thereby of preventing the object from coming into contact with electromagnets due to the oscillation.

In view of one aspect of the present invention, it provides a control apparatus in a magnetic levitation system, for controlling attraction and/or repulsion forces created from a pair of electromagnets to levitate an object therebetween at a predetermined target position in a contactless manner, in response to a displacement of the object from the target position, the control apparatus comprising: (a) a start/stop detector for detecting a start and stop of a levitation control procedure and generating a control signal having a predetermined time duration when either of the start and stop of the levitation control procedure is detected; (b) a compensation circuit for providing a compensation signal to compensate AC currents flowing through the electromagnet so that the displacement of the object from the target position becomes zero; (c) an integrator for integrating the compensation signal; and (d) a switching circuit for providing the compensation signal outputted from the compensation circuit when the control signal is not generated from the start/stop detector, and the integrated compensation signal outputted from the integrator when the control signal is generated, whereby the magnetic forces from the electromagnets to the object gradually varies at the beginning and ending of the procedure and hence the object is gradually levitated and seated.

In view of another aspect of the present invention, it provides a control apparatus in a magnetic levitation system, for controlling attraction and/or repulsion forces created from a pair of electromagnets to levitate an object therebetween at a predetermined target position in a contactless manner, in response to a displacement of the object from the target position, the control apparatus comprising: (a) a start/stop detector for detecting a start and stop of a levitation control procedure and generating a control signal having a predetermined time duration when either of the start and stop of the levitation control procedure is detected; (b) a compensation circuit for providing a compensation signal to compensate AC currents flowing through the electromagnet so that the displacement of the object from the target position becomes zero; (c) an integrator for integrating a signal representing the displacement of the object from the target position; and (d) a switching circuit for providing the displacement signal to the compensation circuit when the control signal is not generated from the start/stop detector, and the integrated displacement signal outputted from the integrator to the compensation circuit when the control signal is generated, whereby the magnetic forces from the electromagnets to the object gradually varies at the beginning and ending of the procedure and hence the object is gradually levitated and seated.

BRIEF DESCRIPTION OF THE DRAWINGS

FIG. 6 is a circuit diagram of a signal integrator incorporated in the system shown in FIG. 5;

FIG. 7 illustrates a graph for explaining a motion of an object at the beginning of a levitation control procedure in the system shown in FIG. 5 according to the present invention; and FIG. 8 shows a graph for explaining a motion of an object at the end of a levitation control procedure in the system shown in FIG. 5 according to the present invention.

DETAILED DESCRIPTION OF THE INVENTION

Figure 1:
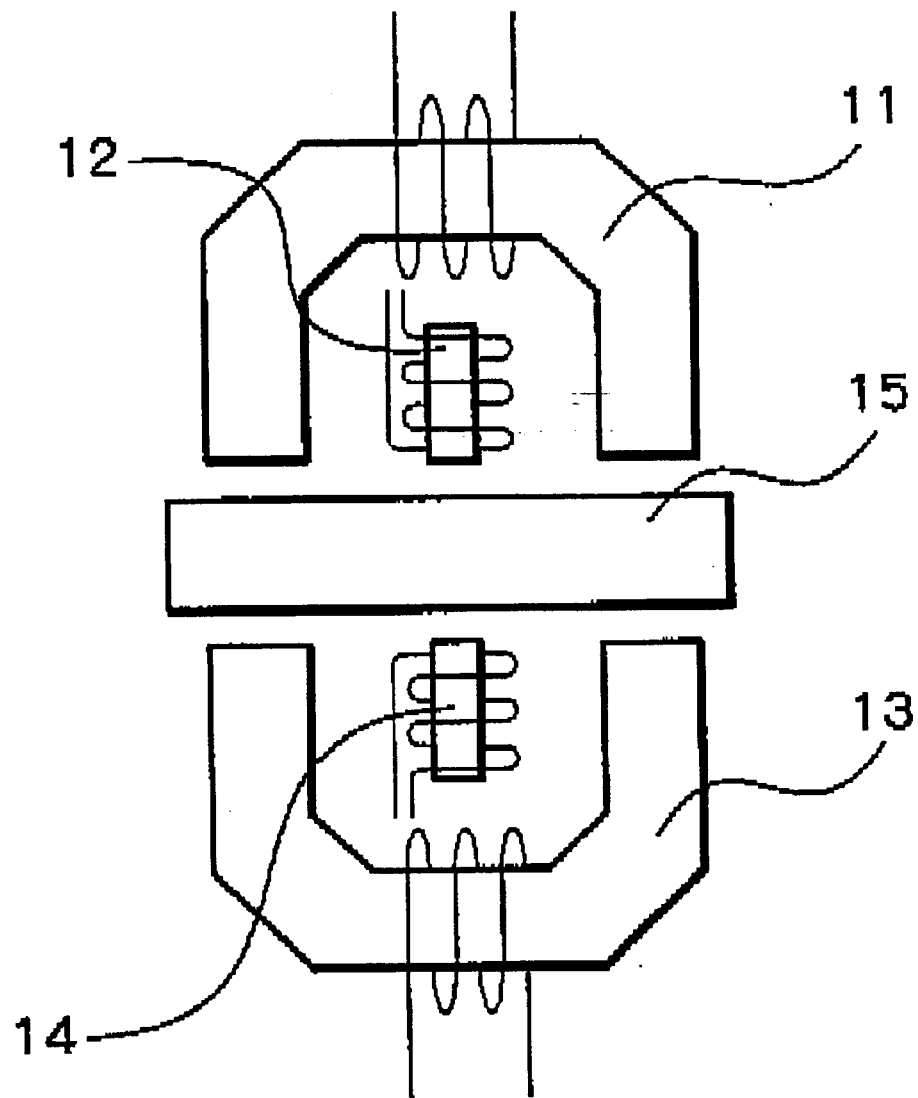
FIG. 1 is a schematic diagram showing relationships in location among an object to be levitated, electromagnets and distance detection sensors in a conventional magnetic levitation system.

Hereafter, embodiments of the present invention will be specifically explained by reference to FIGS. 5–9. In these drawings, the same reference numerals and symbols as those in FIGS. 1–4 denote the same or similar components as or to those in FIGS. 1–4.

Figure 2:
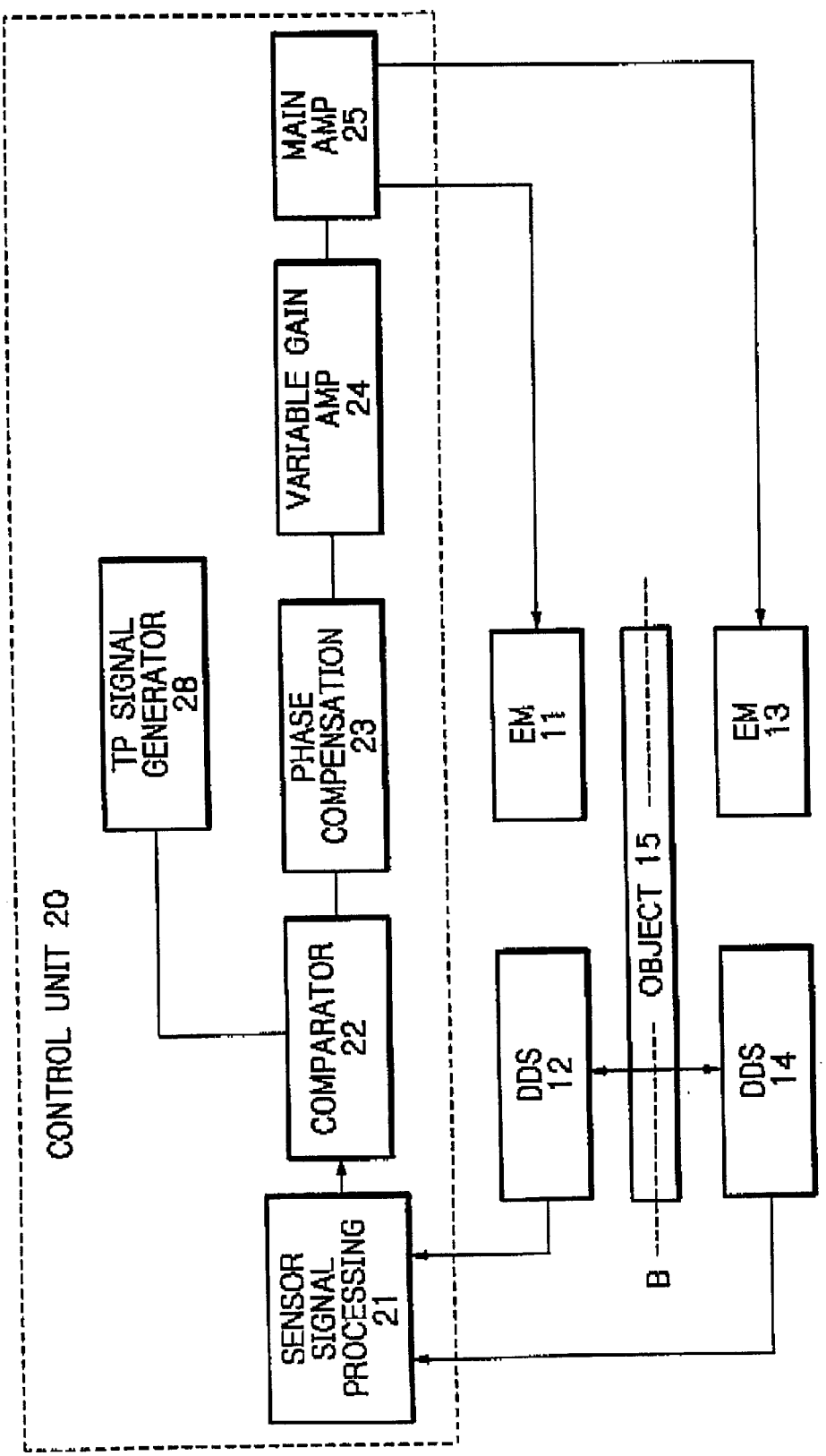
FIG. 2 is a block diagram indicating a constitution of a magnetic levitation system according to a prior art.
Figure 5:
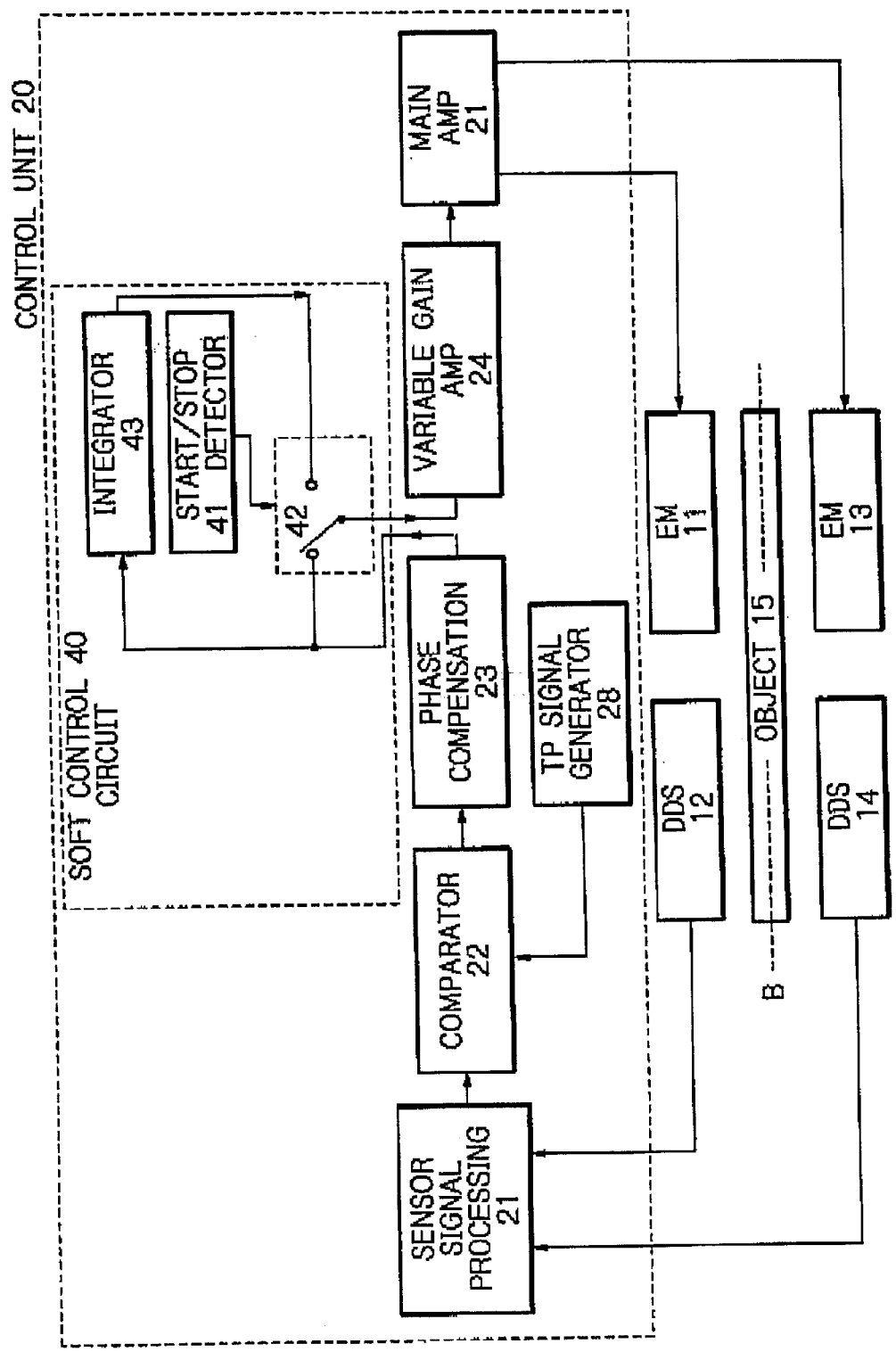
FIG. 5 is a block diagram illustrating a magnetic levitation system according to the present invention.

FIG. 5 shows an embodiment of a magnetic levitation system according to the present invention. The system comprises electromagnets 11 and 13, distance detection sensors 12 and 14, and a control unit 20, wherein a target object 15 of a magnetizable material is positioned between the electromagnets 11 and 13 and between the distance detection sensors 12 and 14, as illustrated in FIGS. 1 and 2. The control unit 20 according to the present invention includes a sensor signal processing circuit 21, comparator 22, a phase compensation circuit 23, a variable gain amplifier 24, a main amplifier 25, and a target position signal generator 28, similar to the prior system shown in FIG. 2, provided that the phase compensation circuit 23 is not directly connected to the variable gain amplifier 24.

The control unit 20 of the present invention additionally contains a soft control circuit 40 including a start/stop detector 41, a switching circuit 42 and a signal integrator 43. The start/stop detector 41 detects starting/stopping of a levitation operation of the system and provides a control signal having a time duration which is nearly equal to, but less than an object fluctuation duration (t0 to t1 shown in FIG. 3). The switching circuit 42 is inserted between the phase compensation circuit 23 and variable gain amplifier 24, and normally connects an output of the compensation circuit 23 with an input of the variable gain amplifier 24. However, it connects an output of the signal integrator 43 to the input of the variable gain amplifier 24 when it receives the control signal from the start/stop detector 41. An input of the signal integrator 43 is connected to the phase compensation circuit 23. The signal integrator 43 constitutes, for instance, as a time constant circuit including a capacitor 43-1 and resistor 43-2, as shown in FIG. 6.

When a levitation control procedure is started in the levitation system shown in FIG. 5, the initiation of the procedure is detected by the start/stop detector 41 of the soft control circuit 40, and then the detector 41 provides the control signal to the switching circuit 42. In response to the control signal, the switching circuit 42 changes its connection condition so as to connect the input of the variable gain amplifier 24 to the output of the signal integrator 43 for the predetermined time duration determined by the control signal. Simultaneously, the signal integrator 43 starts integrating a compensation signal from the compensation circuit 23 to smooth the signal. Therefore, the integrated signal is applied to the variable gain amplifier 24 through the switching circuit 42.

Figure 3:
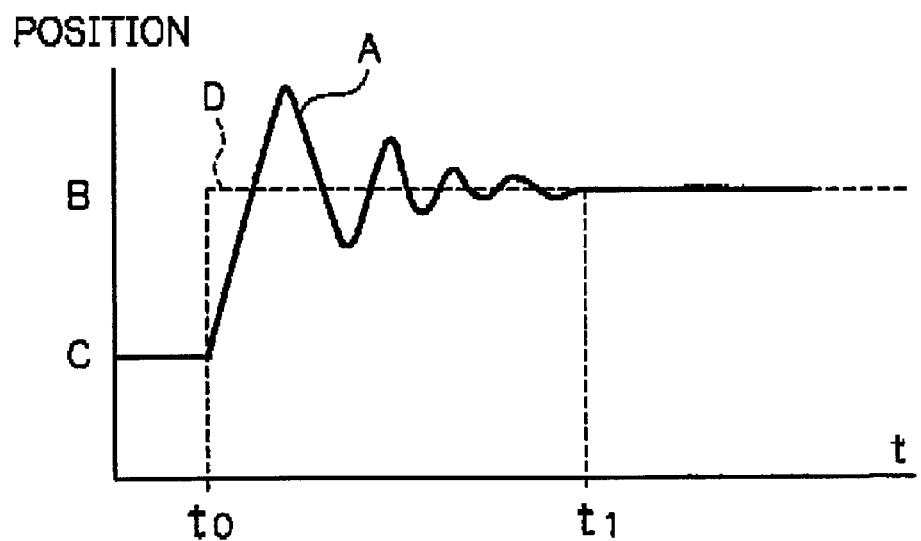
FIG. 3 shows a graph for explaining a motion of an object at the beginning of a levitation control procedure in the prior art system shown in FIG. 2.
Figure 4:
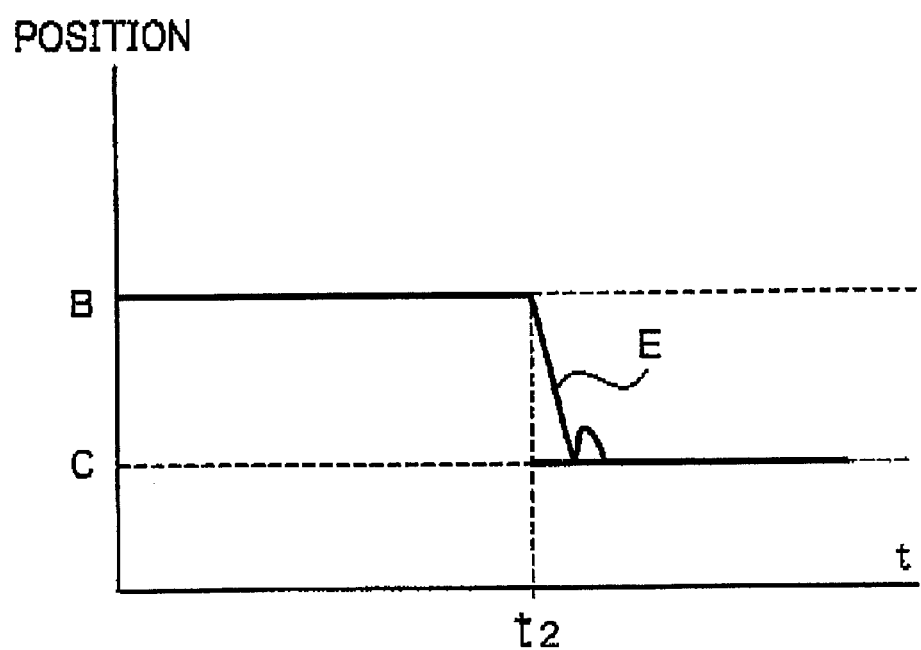
FIG. 4 shows a graph for explaining a motion of an object at the end of a levitation control procedure in the prior art system shown in FIG. 2.

Consequently, each of AC currents flowing through the electromagnets 11 and 13 is not suddenly varied at the beginning of the levitation operation, and thus magnetic attraction and/or repulsion forces therefrom gradually increase. Therefore, the object 15 is gradually levitated from a seated position C to a target position B as is indicated by G shown in FIG. 7, and thus fluctuation of the object 15 indicated by A shown in FIGS. 7 and 3 is prevented.

After the time duration expires, the control signal from the start/stop detector 41 is disabled. As a result, the switching circuit 42 returns to its normal condition so as to connect the input of the variable gain amplifier 24 with the output of the compensation circuit 23. Therefore, the levitation of the object 15 is controlled by the normal feedback manner.

Further, in the system shown in FIG. 5, when the levitation control procedure should be stopped, the target position signal generator 28 changes the level of the target position signal to represent the seated position C. In response thereto, the compensation circuit 23 changes its compensation output stepwise. At that time, since the start/stop detector 41 detects the ending of the levitation control procedure and thus creates a control signal again to the switching circuit 42, the steeply varied compensation output from the phase compensation circuit 23 is not transferred to the variable gain amplifier 24. Instead, the amplifier 24 receives the smoothed compensation signal from the signal integrator 43, and thus the magnetic forces of the electromagnets 11 and 13 gradually vary. Therefore, the object 15 can soft land at the seated position C, as illustrated by F in FIG. 8, in comparison with an object movement denoted by E in FIG. 8 according to the prior levitation system shown in FIG. 2.

Although the RC circuit as shown in FIG. 6 is utilized as the signal integrator 43 in the above embodiment, any other integrator may be employed instead thereof. However, it is preferable to use a variable time constant circuit as the integrator to adjust the smoothing curve therefrom.

Figure 9:
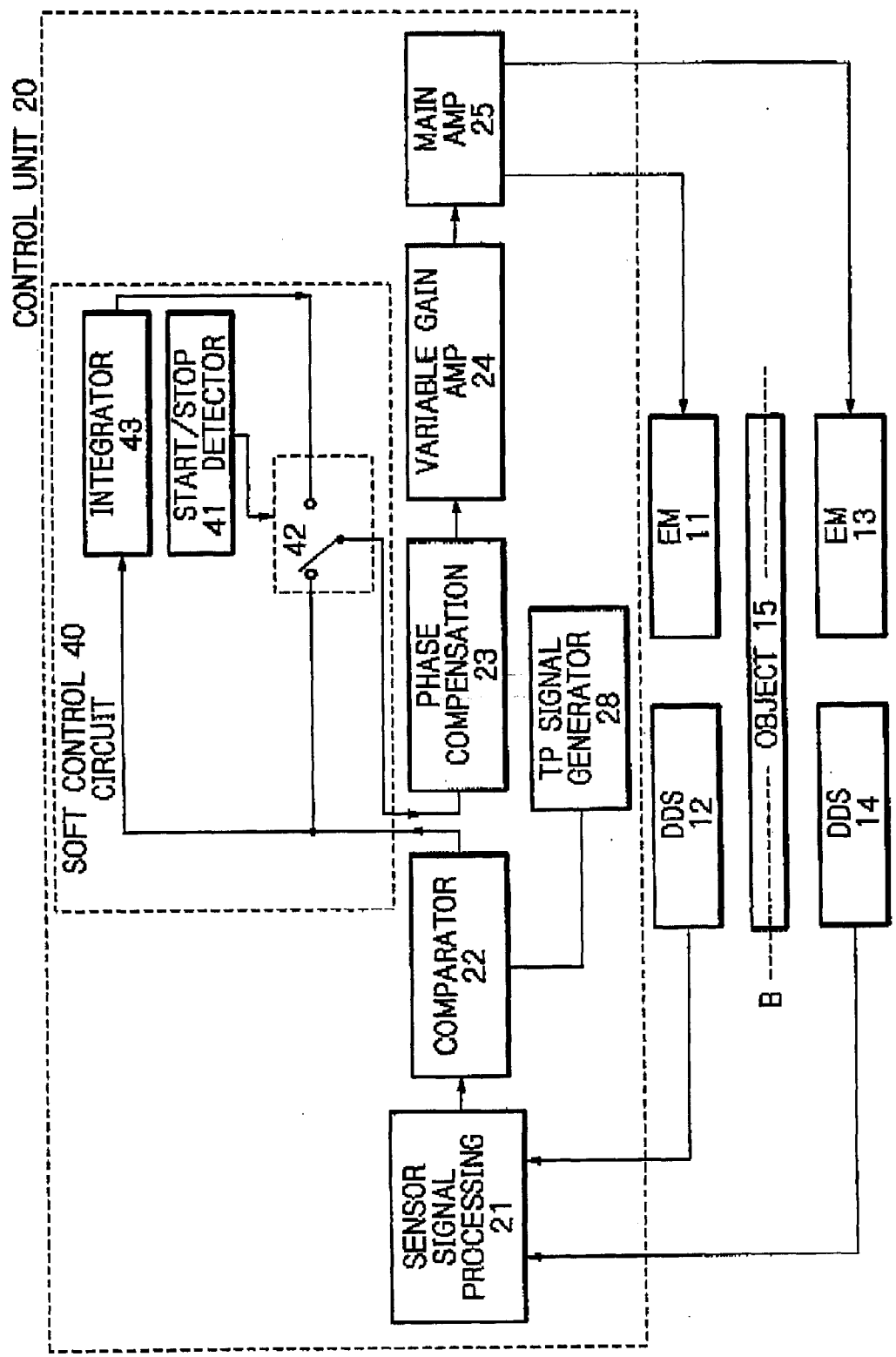
FIG. 9 is a block diagram illustrating another magnetic levitation system according to the present invention.

FIG. 9 shows another embodiment of the present invention, in which a signal switching circuit 42 is inserted between a comparator 22 and a phase compensation circuit 23. The remaining components are the same as those in the first embodiment shown in FIG. 5. The second embodiment operates in a similar manner to the first embodiment, provided that a signal integrator 43 integrates an output signal from the comparator 22, and the switching circuit 42 selectively outputs the comparator output signal and the integrated signal thereof to the phase compensation circuit 23 in the second embodiment. This embodiment can derive the same advantages as those in the first one.

Further, in order to obtain gradual levitation and descent of the object at the beginning and ending of the levitation control procedure, it is possible to vary the level of the target position signal from the target position signal generator 28, such that the comparator 22 provides a displacement signal which gradually increases and decreases at the beginning and ending of a levitation control procedure.

As is described above, the control apparatus according to the present invention is capable of soft levitation and soft landing of an object at the beginning and ending of a levitation control procedure, respectively. Therefore, it can prevent the object from contact with electromagnets. Consequently, failure of the object and electromagnets caused by the contact can be prevented and thus occurrence of dust can be also prevented.

It is further understood by those skilled in the art that the forgoing description is preferred embodiments of the disclosed device and that various changes and modifications may be made in the invention without departing from the spirit and scope thereof.

What is claimed is:

1. A control apparatus in a magnetic levitation system, for controlling attraction and/or repulsion forces created from a pair of electromagnets to levitate an object therebetween at a predetermined target position in a contactless manner, in response to a displacement of the object from the target position, the control apparatus comprising:

a start/stop detector for detecting a start and stop of a levitation control procedure and generating a control signal having a predetermined time duration when either of the start and stop of the levitation control procedure is detected;

a compensation circuit for providing a compensation signal to compensate AC currents flowing through the electromagnets so that the displacement of the object from the target position becomes zero;

an integrator for integrating the compensation signal; and a switching circuit for providing the compensation signal outputted from the compensation circuit when the control signal is not generated from the start/stop detector, and the integrated compensation signal outputted from the integrator when the control signal is generated, whereby the magnetic forces from the electromagnets to the object gradually varies at the beginning and ending of the procedure and hence the object is gradually levitated and seated.

2. A control apparatus in a magnetic levitation system, for controlling attraction and/or repulsion forces created from a pair of electromagnets to levitate an object therebetween at a predetermined target position in a contactless manner, in response to a displacement of the object from the target position, the control apparatus comprising:

a start/stop detector for detecting a start and stop of a levitation control procedure and generating a control signal having a predetermined time duration when either of the start and stop of the levitation control procedure is detected;

a compensation circuit for providing a compensation signal to compensate AC currents flowing through the electromagnets so that the displacement of the object from the target position becomes zero;

an integrator for integrating a signal representing the displacement of the object from the target position; and a switching circuit for providing the displacement signal to the compensation circuit when the control signal is not generated from the start/stop detector, and the integrated displacement signal outputted from the integrator to the compensation circuit when the control signal is generated, whereby the magnetic forces for the electromagnets to the object gradually varies at the beginning and ending of the procedure and hence the object is gradually levitated and seated.

* * * * *